United States Patent
Wu et al.

(10) Patent No.: US 6,646,042 B2
(45) Date of Patent: Nov. 11, 2003

(54) COATING COMPOSITION FOR VIBRATION DAMPING, AND METHOD FOR PRODUCING THE SAME

(75) Inventors: Guozhang Wu, Yokohama (JP); Tetsuya Ito, Machida (JP); Masao Sumita, 4-13, Terao-minami 2-chome, Ayase-shi, Kanagawa 252-1134 (JP)

(73) Assignees: Masao Sumita, Ayase (JP); Tadashi Miura, Iruma (JP)

( * ) Notice: Subject to any disclaimer, the term of this patent is extended or adjusted under 35 U.S.C. 154(b) by 72 days.

(21) Appl. No.: 09/899,092

(22) Filed: Jul. 6, 2001

(65) Prior Publication Data
US 2002/0183432 A1 Dec. 5, 2002

(30) Foreign Application Priority Data

Apr. 17, 2001 (JP) ........................................ 2001-118920

(51) Int. Cl.$^7$ .............................................. C08F 122/10
(52) U.S. Cl. ...................... 524/560; 524/563; 524/345; 524/449; 524/451; 524/425; 524/442
(58) Field of Search ................................ 524/323, 348, 524/449, 425, 451, 502, 524, 351, 352, 442, 560, 563, 345; 525/455; 521/67, 128; 106/724, 773, 778, 788

(56) References Cited

U.S. PATENT DOCUMENTS 3,843,576 A    10/1974    Parkinson 5,230,940 A         7/1993    Böhm et al.
5,435,842 A    *    7/1995    Mukaida et al. ............ 106/672
6,265,475 B1   *    7/2001    Chifei et al. ................ 524/127

FOREIGN PATENT DOCUMENTS

| DE | 2 012 465 | 10/1971 |
| EP | 0 698 644 A1 | 2/1996 |
| JP | 2000-273435 | 10/2000 |

\* cited by examiner

Primary Examiner—David W. Wu
Assistant Examiner—Satya Sastri
(74) Attorney, Agent, or Firm—Birch, Stewart, Kolasch & Birch, LLP

(57) ABSTRACT

Provided is a coating composition for damping purposes, capable of forming the thin film applicable to damping and sound absorption at a vibration- or sound-generation section of complex shape, which comprises the following coating components (i), (ii) and (iii):

(i) a resin emulsion containing a polar group capable of forming the coating film containing the hydrogen bond which is formed when the polar group comes into contact with an aromatic compound as the following coating component (ii) having the hydrogen bond forming effect, (ii) an aromatic compound which has the effect of forming and controlling the hydrogen bond, and also has at least one hydroxyl group in the molecule, and (iii) an inorganic filler, and also provides a method for producing the same.

Also a method of producing the coating composition is provided.

13 Claims, 4 Drawing Sheets

EFFECTS OF LOSS MODULUS OF ELASTICITY (E") AND FILM THICKNESS (t) ON LOSS FACTOR ($\eta$)

COATING COMPOSITION FOR VIBRATION DAMPING, AND METHOD FOR PRODUCING THE SAME

FIELD OF THE INVENTION

The present invention relates to a coating composition for vibration damping and a method for producing the same, more particularly a coating composition capable of forming a damping film over a vibration- or sound-generating portion of an automobile, building, various industrial machines and facilities, home electronic appliances, medical equipment, among others, to absorb vibration or sound generated at such a portion, particularly efficiently in a low frequency range and also efficiently even in a high frequency range.

BACKGROUND OF THE INVENTION

Formed articles, such as plate- and sheet-shaped articles, of materials having vibration- or sound-absorbing materials, have been proposed as damping materials. However, when a portion at which vibration or sound is generated has a complex shape, the above damping material cannot sufficiently exhibit its inherent damping effect, because of significant difficulties in application of the material to such a shape. In order to overcome these difficulties, various types of coating materials have been proposed to realize the vibration- or sound-absorbing effect by the films of such materials spread over the portion in question by an adequate method, e.g., spraying. These coating materials for damping purposes include aqueous coating materials comprising, e.g., asphalt, rubber or synthetic resin as the extender incorporated with a synthetic rubber powder to improve coating film hardness, and resin emulsions dispersed with activated carbon as the filler, which serve as the coating materials suitable for automobile interiors.

However, many of the conventional coating compositions for damping purposes are reinforced for the vibration-absorbing effect of the film-forming component with an inorganic powder or the like, which has failed to greatly improve the vibration- or sound-absorbing effect of the film-forming component itself. When the damping material is used in the form of film, its thickness is limited normally to 2 mm or less, particularly 1 mm or less. However, it is found that the damping film loses loss factor η rapidly as its thickness decreases, making it difficult to efficiently absorb vibrational or acoustic energy from the outsides. Under these developmental situations, development of a coating material which can exhibit high degree of damping effect even by the thin film has been keenly in demand.

SUMMARY OF THE INVENTION

It is an object of the present invention to provide a coating composition for damping purposes, capable of forming the damping film excellent in vibration- and sound-absorbing effects and having loss factor η as the vibration absorption evaluation index not extremely decreasing as its thickness decreases, in consideration of the above situations.

It is another object of the present invention to provide a coating composition for damping purposes which is formed into the damping film capable of contributing to improved efficiency of vibration- and sound-absorption in both low and high frequency ranges, even when the film is thin.

Also it is another object of the present invention to provide a method for producing the coating composition for damping purposes, capable of forming the damping film excellent in vibration and sound absorbing effect.

The inventors of the present invention have found, after having extensively studied to improve loss factor h of the thin film as the object of this invention, that loss factor h largely depends on the product of loss modulus E" and film thickness "t," by which is meant that it is essential to increase loss modulus E" in order to improve loss factor h at a certain film thickness or to secure a high loss factor h by the thin film. They have grasped, based on the above knowledge, that the coating film comprising a resin emulsion containing a polar group has an increased content of the hydrogen bonds when the emulsion is incorporated with a component having ability of forming the hydrogen bond (hereinafter referred to as "hydrogen bond forming component") and the hydrogen bond content can be controlled, and that the coating film having the controlled content of the hydrogen bonds has a high loss modulus E" giving a high loss factor h even when the film is thin and has excellent effects of absorbing vibrational and acoustic energy from the outsides.

The inventors of the present invention have further investigated the above phenomena to find the cycles that, when vibrational/acoustic energy from the outsides enters the coating film, the hydrogen bond formed while the coating film absorbs the energy is dissociated, and formed again after the energy generated while the hydrogen bond is restored is released as heat, and also find that the coating film has an increased loss modulus E" and loss factor ii, as the hydrogen bond forming effect of the hydrogen bond forming component increases, heat of the dissociation increases, or the hydrogen bond of adequate strength is formed. They have also found that the coating film shows the high damping effect, when it has the hydrogen bond whose intensity is controlled in response to intensity of the vibrational energy from the outsides, reaching the present invention.

The first invention relates to a coating composition for damping purposes, which comprises the following coating components (i), (ii) and (iii):

(i) a resin emulsion containing a polar group capable of forming the coating film containing the hydrogen bond which is formed when the polar group comes into contact with an aromatic compound as the following coating component (ii) having the hydrogen bond forming effect, (ii) an aromatic compound which has the effect of forming and controlling the hydrogen bond, and also has at least one hydroxyl group in the molecule, and (iii) an inorganic filler.

The second invention provides a coating film for damping purposes which is formed using the above coating composition, having a loss factor η at a coating film thickness of 2 mm or more, and 0.03 or more and 0.065 or more at frequency of 50 and 1200 Hz, respectively.

The third invention relates to a method of producing a composition for damping purposes, which comprises the following steps (1) and (2):

(1) a step of dispersion and mixing the above-described coating components (i) and (ii) with each other, and (2) a step of mixing the above mixture with the above-described coating component (iii).

The present invention also provides a method of producing the above-described coating composition for damping purposes, which comprises the following 2 steps;

(1) a step of bringing the above-described coating component (ii) into contact with the above-described coating component (iii) in the presence of a solvent which can dissolve the coating component (ii), and thereby impregnating the coating component (iii) with the coating component (ii), and (2) a step of mixing the resultant impregnated component with the above-described coating components (i).

The present invention also provides a method of producing the above-described coating composition for damping purposes, which comprises the following 2 steps;

(1) a step of bringing the above-described coating component (ii) into contact with the above-described coating component (iii) in the presence of a solvent which can dissolve the coating component (ii), and thereby impregnating the coating component (iii) with the coating component (ii), and (2) a step of mixing the resultant impregnated component with the above-described coating components (ii).

As described above, the present invention relates to a coating composition for damping purposes, capable of forming the coating film containing the hydrogen bond, and the preferred embodiments include the following compositions (1) to (5):

(1) A coating composition for damping purposes, comprising 20 to 70% by weight of an acrylic resin emulsion, 2 to 30% by weight of a phenolic compound represented by the general formula (III), 15 to 50% by weight of mica, and a dispersant, flow improver, thickening agent and viscosity adjusting agent.

(2) A coating composition for damping purposes, comprising 20 to 70% by weight of an acrylic resin emulsion, 2 to 30% by weight of a phenolic compound represented by the general formula (III), 15 to 50% by weight of montmorillonite, and a dispersant, flow improver, thickening agent and viscosity adjusting agent.

(3) A coating composition for damping purposes, comprising 20 to 70% by weight of an ethylene/vinyl acetate copolymer emulsion, 2 to 30% by weight of a naphthalene-based compound represented by the general formula (II), 15 to 50% by weight of saponite, and a dispersant, flow improver, thickening agent and viscosity adjusting agent.

(4) A coating composition for damping purposes, comprising 20 to 70% by weight of an ethylene/vinyl acetate copolymer emulsion, 2 to 30% by weight of a phenolic compound represented by the general formula (III), 15 to 50% by weight of mica, and a dispersant, flow improver, thickening agent and viscosity adjusting agent.

(5) A coating film for damping purposes, comprising one of the above-described coating compositions (1) to (4), having an infrared absorption intensity (1720 to 1690 cm$^{-1}$)/infrared absorption intensity (1750 to 1720 cm$^{-1}$) ratio of 0.2 or more and loss modulus E" is $1.08 \times 10^8$ N·m$^{-2}$ or more.

Figure 1:
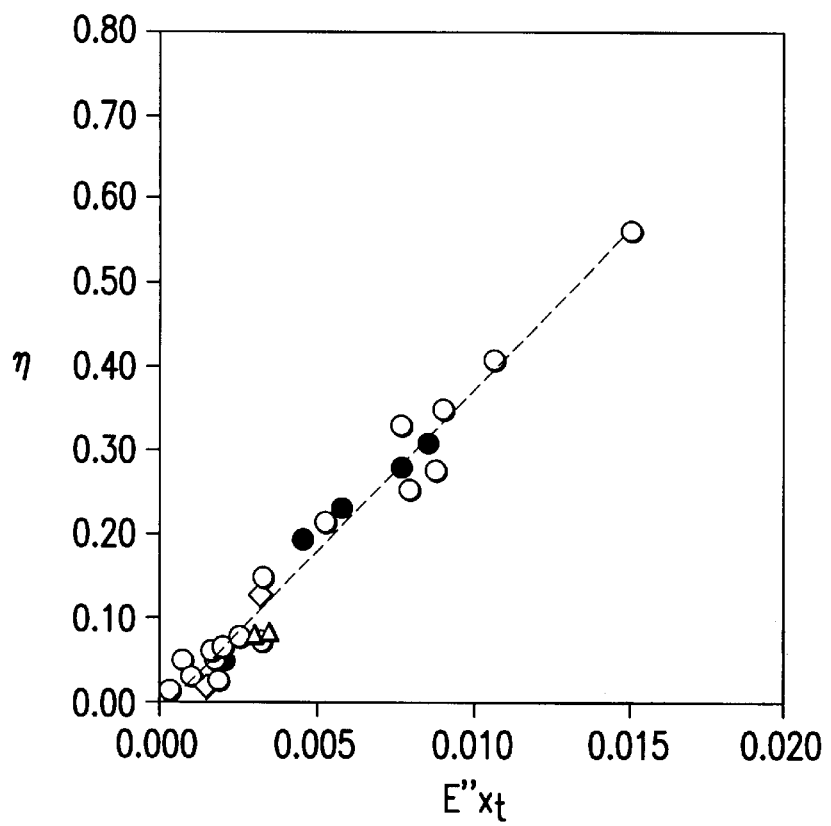
FIG. 1 shows the effects of loss modulus of elasticity (E") and coating film thickness (t) on loss factor ($\eta$).

| NOTATION | |
| --- | --- |
| BL | Coated sample |
| Al | Aluminum base |
| F | Fixing device |
| IP | Impact hummer |
| AP | Amplifier |
| AN | Transmission function analyzing device |

PREFERRED EMBODIMENTS

The present invention is described more concretely.

The coating composition of the present invention for damping purposes comprises the following coating components (i), (ii) and (iii):

(i) a resin emulsion containing a polar group, capable of forming the coating film containing the hydrogen bond which is formed when the polar group comes into contact with an aromatic compound as the following coating component (ii) having the hydrogen bond forming effect, (ii) an aromatic compound which has the effect of forming and controlling the hydrogen bond, and also has at least one hydroxyl group in the molecule, and (iii) an inorganic filler.

The resin emulsion containing a polar group as the component (i) for the present invention forms the coating film containing the hydrogen bond formed by its reaction with the component (ii) having the hydrogen bond forming effect. The polar group for the resin emulsion is not limited, so long as it can form the hydrogen bond in the coating film of the resin emulsion. These groups include carbonyl, ether, hydroxyl, amide, imide, nitrile, sulfonyl and thiol. The concrete examples of the emulsions containing the polar group which can increase the hydrogen bond and control its content include the emulsions of acrylic-based resin, acrylic-styrene-based resin, vinyl acetate-based resin, vinyl acetate-acrylic-based resin, ethylene-vinyl acetate-based resin, vinyl chloride-acrylic-based resin, ethylene-vinyl chloride-based resin, vinyl chloride-based resin, vinylidene chloride-based resin, styrene-butadiene-based resin, acrylonitrile-butadiene-based resin, polyvinyl alcohol-based resin, urethane-based resin, epoxy-based resin, phenol-based resin, alkyd-based resin, and polyester-based resin. Of these, the more preferable emulsions are those of acrylic resin, acrylic-styrene-based resin, and ethylene-vinyl acetate-based resin. The examples of the emulsions of the acrylic-based resin include those of the acrylate ester polymers of methyl acrylate, ethyl acrylate, n-propyl acrylate, isopropyl acrylate, n-butyl acrylate, isobutyl acrylate, and tetracyclodecyl acrylate, and copolymers of these acrylates.

The component (i) for the coating composition of the present invention for damping purposes preferably has a glass transition temperature of −20 to 50° C. for the damping effect.

The above-described resin emulsion is dispersed or emulsified using water or another solvent. The aqueous emulsion produced using water is preferable for environmental protection, simplicity of the preparation procedure, and uniform quality of the film it gives. The resin emulsion is arbitrarily adjusted for its solid content, which is preferably in the range of 20 to 80% by weight, more preferably 35 to 65% by weight. The resin for the emulsion preferably has an average particle size of 0.01 to 50 μm, more preferably 0.1 to 10 μm. The emulsion of the resin having the above average particle size gives the coating film in which it is uniformly dispersed in the coating components (ii) and (iii).

The resin emulsion is incorporated at 10 to 75% by weight, based on the whole coating composition for damping purposes, preferably 30 to 60% by weight. At a content less than 10% by weight, the coating film it gives may easily come off. At more than 75% by weight, on the other hand, the problem of insufficient number of hydrogen bonds per unit weight of the resin may occur, making it difficult for the coating film to exhibit the sufficient damping effect.

The aromatic compounds useful as the coating component (ii) capable of forming the hydrogen bond include those having hydroxyl and/or amino groups. These compounds are monocyclic or polycyclic, and preferably selected from the group consisting of:

(i) an aromatic compound having at least one hydroxyl group in the molecule, and (ii) an aromatic compound having at least one hydroxyl group and at least one amino group in the molecule.

More concretely, these aromatic compounds include those represented by one of the following general formulae (I) to (IV):

(1) General formula (I)

(2) General formula (II)

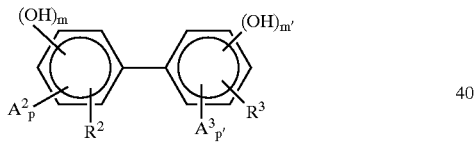

(3) General formula (III)

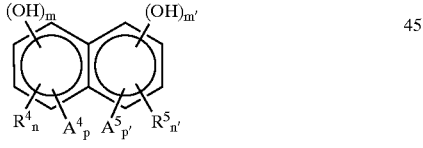

(4) General formula (IV)

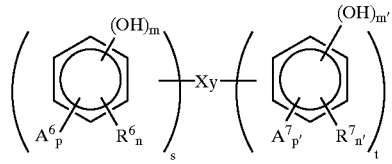

wherein, for the general formulae (I) to (IV)

(1) $R^1$ to $R^7$ are each a hydrocarbon group having a carbon number of 1 to 10, and may be the same or different, more concretely, alkyl or alkenyl, e.g., methyl, ethyl, n-propyl, i-propyl, n-butyl, i-butyl, t-butyl, n-pentyl, i-pentyl, n-hexyl and i-hexyl;

(2) (n) and (n') are each an integer of 1 to 3, and may be the same or different;

(3) (m) and (m') are each an integer of 1 or 2, and may be the same or different; (4) $A^1$ to $A^7$ are each a nitrogen-containing group, and may be the same or different, more concretely, amino group;

(5) (p) and (p') are each an integer of 1 or 3, and may be the same or different;

(6) (s) is an integer of 1 or 3, and may be the same or different;

(7) (t) is an integer of 1 or 3, and may be the same or different;

(8) X is an atom selected from the group consisting of oxygen, sulfur and a halogen, or hydrocarbon group optionally containing the above atom and having a carbon number of 1 to 20, the hydrocarbon groups including alkylene and cycloalkylene, e.g., methylene, ethylene, propylene, n-butylene, I-butylene, pentylene, hexylene and heptylene, and unsaturated groups thereof, e.g., vinylene, propylidene, isopropylidene, butylidene, isobutylidene, cyclohexylene, and aromatic groups. Of these, the preferable ones are those represented by one of the following formulae (1) to (3). The group containing an ester bond is the one containing —CO—O—, the concrete examples including those represented by one of the following formulae (4), (5), (6) and (7). Of these, the more preferable one is the tetraester type bond represented by the formula (7).

(9) (y) is 1.

The concrete examples of the phenol-based compounds represented by one of the general formulae (I) to (IV) include 2-tert-butylphenol; 2-ethyl-6-methylphenol; 2,6-di-tert-butylphenol; 3-methyl-2,6-bis(1-methylethyl)phenol; 4-methyl-2,6-di-tert-butylphenol; 3-methyl-2,6-bis(1-methylpropyl)phenol; 2-butyl-6-ethylphenol; 4-butyl-2,6-di-tert-butylphenol; 4-tert-butyl-2,6-dimethylphenol; 6-tert-butyl-2,3-dimethylphenol; 2-tert-butyl-4-methylphenol; 2-cyclohexyl-6-tert-butylphenol; 2-cyclohexyl-6-tert-butyl-4-methylphenol; 2-tert-butyl-4,6-dimethylphenol; 4,4'-dihydroxybiphenyl; 4,4'-thiobislphenol; hydroquinone; 1,5-hydroxynaphthalene; 4,4'-thiobis(3-methyl-6-tert-butylphenol); 4,4'-thiobis(2-methyl-6-tert-butylphenol); 4,4'-thiobis(4,6-di-tert-butylphenol); 4,4'-methylenebis(2,6-di-tert-butylphenol); 4,4'-ethylenebis(2,6-di-tertbutylphenol); 4,4'-propylidenebis(2-methyl-6-tert-butylphenol); 4,4'-bis(2,6-di-tert-butylphenol); 4,4'-bis(2-methyl-6-tert-butylphenol); 2,2'-methylenebis(4-ethyl-6-tert-butylphenol); 2,2'-methylenebis(4-methyl-6-tert-butylphenol); 4,4'-butylidenebis(3-methyl-6-tert-butylphenol); 4,4'-isopropylidenebis(2,6-di-tert-butylphenol); 2,2'-methylenebis(4-methyl-6-nonylphenol); 2,2'-isobutylidenebis(4,6-dimethylphenol); and 2,2'-methylenebis(4-methyl-6-cyclohexylphenol). The other examples include 1,6-hexanediol-bis[β-(3,5-di-tert-butyl-4-hydroxyphenyl)propionate]; 1,4-bis(4-benzoyl-3-hydroxyphenoxy)-butane; 2,2-thio-di-ethylenebis[β-(3,5-di-tert-butyl-4-hydroxyphenyl)propionate]; tris(3,5-di-tert-butyl-4-hydroxybenzyl)-isocyanurate; 1,1,3-tris(5-tert-butyl-4-hydroxy-2-methylphenyl)butane; 1,3,5-trimethyl-2,4,6-tris(3,5-di-tert-butyl-4-hydroxybenzyl)-benzene; tetrakis(methylene-3,5-di-tert-butyl-4-hydrocinnamate); triethyleneglycol-bis[β-(3-tert-butyl-5-methyl-4-hydroxyphenyl)propionate]; and 3,9-bis[1,1-dimethyl-2-[β3-(3-tert-butyl-4-hydroxy-5-methylphenyl) propionyloxyethyl]ethyl]-2,4,8,10-tetraoxospiro-[5,5] undecane. The particularly preferable examples include 4,4'-thiobis(3-methyl-6-tert-butylphenol); 4,4'-thiobis(2-methyl-6-tert-butyl-phenol); 4,4'-methylenebis(2,6-di-tert-butylphenol); 4,4'-ethylenebis(2,6-di-tert-butylphenol); 4,4'-propylidenebis(2-methyl-6-tert-butylphenol); 4,4'-isopropylidenebis(2,6-di-tert-butylphenol); 2,2'-methylenebis(4-methyl-6-tert-butylphenol); 2,2'-methylenebis(4-ethyl-6-tert-butylphenol); 2,2'-isobutylidenebis(4,6-dimethylphenol); 2,2'-methylenebis(4-methyl-6-cyclohexylphenol); tetrakis(methylene-3,5-di-tert-butyl-4-hydrocinnamate); 4,4'-dihydroxybiphenyl; 4,4'-thiobisphenol; and 1,5-dihydroxynaphthalene.

The aromatic compounds having hydroxyl and amino groups useful for the present invention include hydroxyamine compounds of naphthalene. The concrete examples include 5-amino-1-naphthol and 2-amino-6-hydroxynaphthol.

The coating component (ii) is incorporated at 2 to 30% by weight, based on the whole coating composition for damping purposes, preferably 2 to 30% by weight. At a content less than 2% by weight, number of the hydrogen bonds may be insufficient to decrease loss factor η. At more than 30% by weight, on the other hand, the sufficient damping effect may not be secured, because of possible phase separation in the coating film.

Next, the inorganic filler for the coating composition of the present invention for damping purposes is described.

The inorganic fillers useful for the present invention include inorganic-, carbon- and organic-based fillers. The inorganic-based fillers include layered compounds containing $SiO_2$, $Al_2O_3$, MgO, $Na_2O$ or the like, e.g., saponite, smectite, montmorillonite, vermiculite, mica, and a mixture thereof, and talc, calcium carbonate, natural and synthetic zeolite, flaky silica. The carbon-based fillers include Ketjen black carbon and flaky graphite. The organic-based fillers include sawdust and rice bran. The particularly preferable inorganic fillers include clay minerals of layered silicate, e.g., the 2:1 type mineral, especially those having a relatively large base interval (e.g., approximately 14 to 15 Å or more), i.e., relatively large in unit structure thickness and cycle in the direction perpendicular to the layer plane. More concretely, these include, in addition to mica, smectite, montmorillonite, saponite and vermiculite.

The inorganic filler is preferably used in the particulate form, or more preferably in the flaky or fibrous form. The filler having an average particle size of 0.1 to 200 μm, more preferably 40 to 100 μm, can greatly contribute to vibration or sound absorption. The inorganic filler is incorporated at 2 to 60% by weight, based on the whole coating composition for damping purposes, preferably 20 to 50% by weight. At a content less than 2% by weight, the sufficient damping effect may not be realized. At more than 60% by weight, on the other hand, the coating film properties, e.g., strength, may be deteriorated also to cause the insufficient damping effect.

The coating composition of the present invention for damping purposes has improved efficiency of absorbing vibration and sound from the outsides, when it contains the layered compound as the inorganic filler at the given content described above, presumably because the resin as the film constituent behaves like independent layers to form the hydrogen bonds of relatively uniform strength with the incorporated aromatic compound.

As described above, the coating components (i), (ii) and (iii) are incorporated at 10 to 75%, 2 to 30% and 2 to 60% by weight, respectively, based on the whole coating composition. They are incorporated preferably at 30 to 60, 6 to 20 and 20 to 55% by weight. The coating film will have a still higher loss factor η, when their contents are controlled at 30 to 46, 10 to 30 and 14 to 50% by weight.

As described above, the coating composition of the present invention for damping purposes comprises, as the essential ingredients, the following coating components (i), (ii) and (iii):

(i) a resin emulsion containing a polar group capable of forming the hydrogen bond in the coating film with the aromatic compound having the hydrogen bond forming effect, (ii) an aromatic compound which has the hydrogen forming effect and at least one hydroxyl group in the molecule, and (iii) an inorganic filler, in order to provide the coating film having the above-described controlled number of the hydrogen bonds.

FIG. 1 shows the effects of loss modulus of elasticity (E") and film thickness (t) on loss factor η. Loss factor η of the coating film decreases as its thickness decreases, but the relationship indicates that the coating film of the present invention can secure a sufficiently high loss factor (η), even when it is thin, because of its high loss modulus of elasticity (E").

Figure 2:
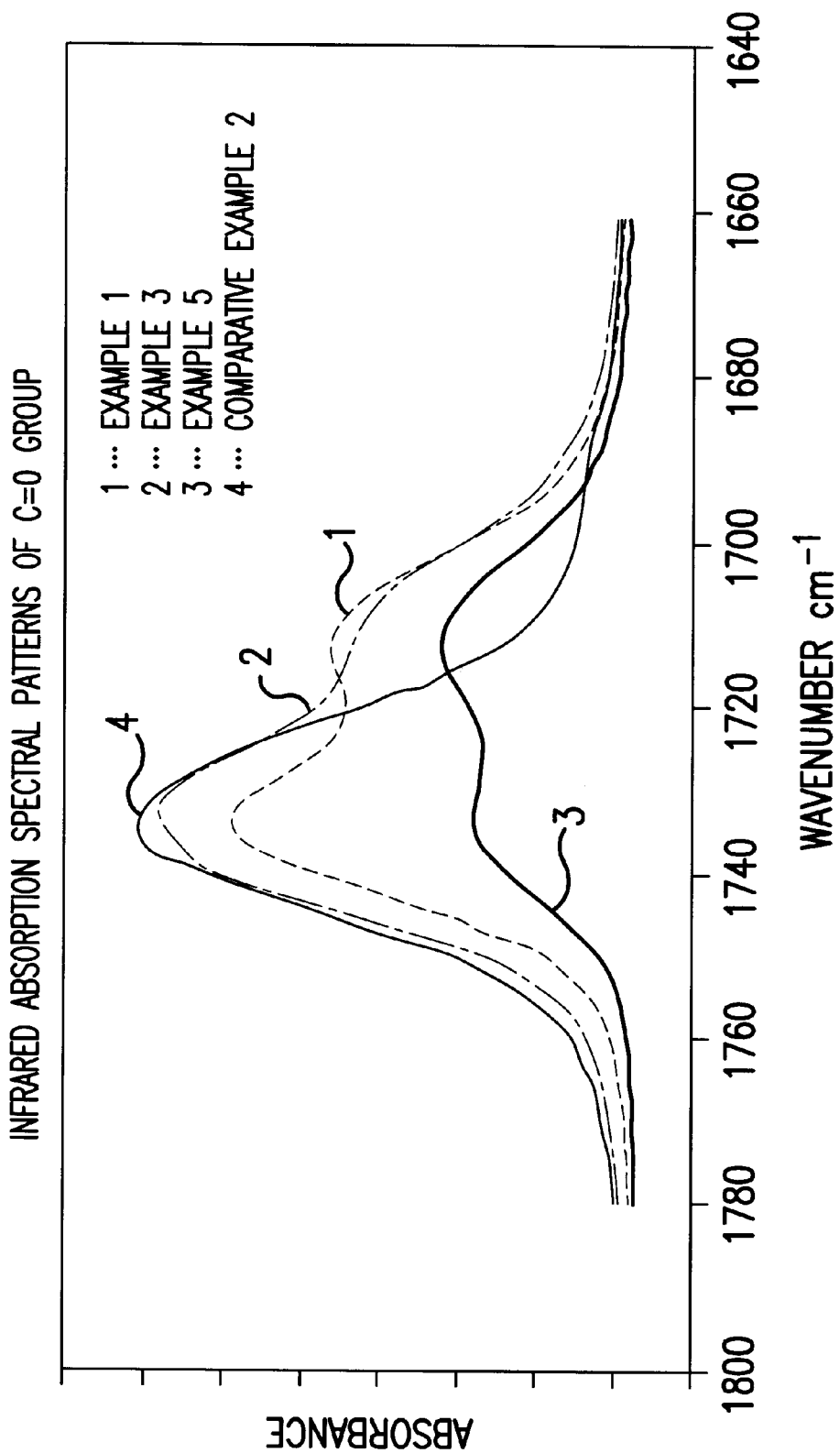
FIG. 2 shows the infrared absorption spectral patterns of C=O of the coating film of the coating composition for damping purposes, prepared in EXAMPLES 1, 3 and 5 and COMPARATIVE EXAMPLE 2.
Figure 3:
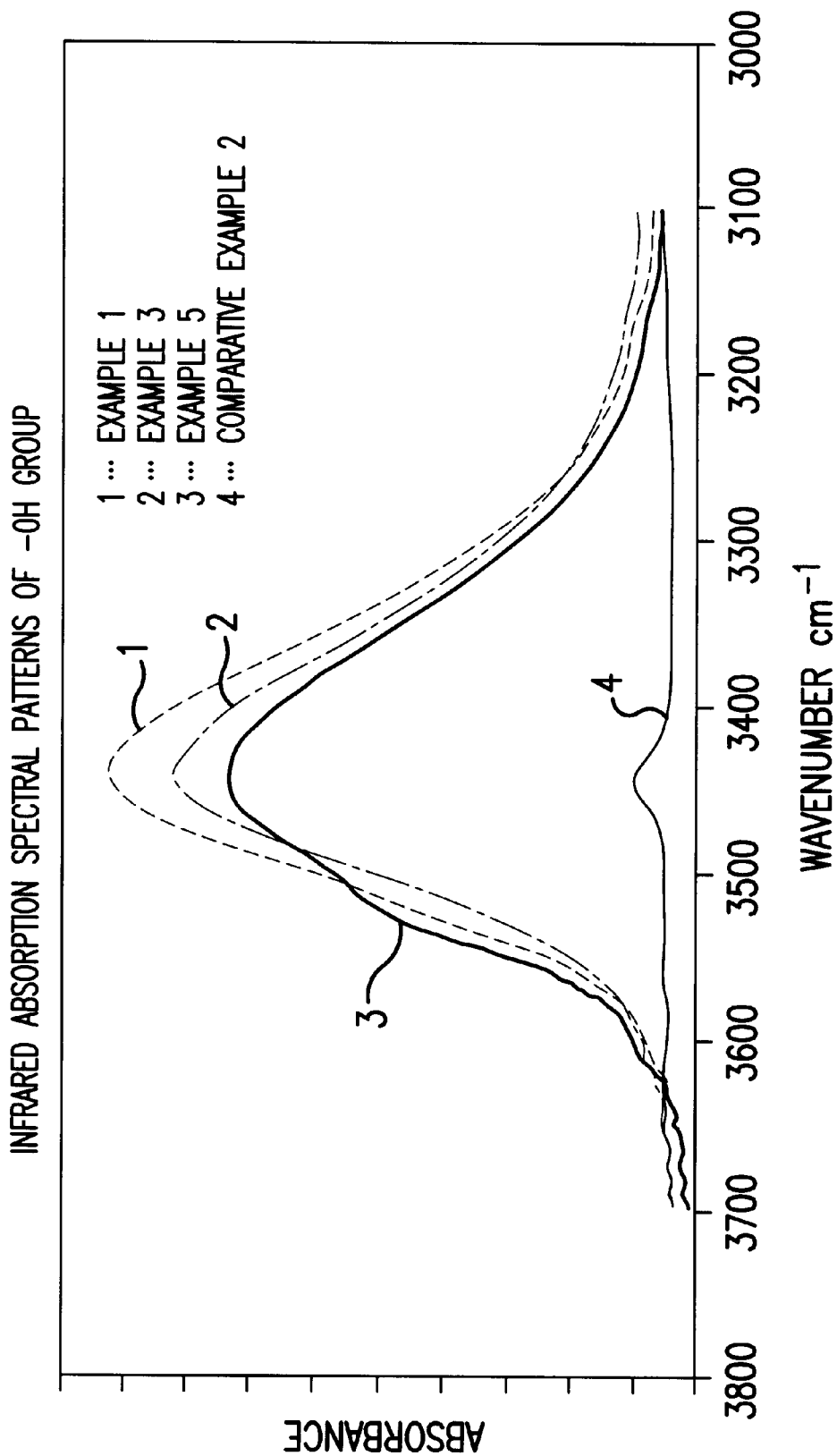
FIG. 3 shows the infrared absorption spectral patterns of —OH group of the coating film of the coating composition for damping purposes, prepared in EXAMPLES 1, 3 and 5 and COMPARATIVE EXAMPLE 2.

The hydrogen bond formed is identified by the infrared absorption spectral patterns of C=O and —OH group emerging in a wave number range of 1750 to 1690 $cm^{-1}$ (FIG. 2) and 3600 to 3300 $cm^{-1}$ (FIG. 3). The absorption in a wave number range of 1750 to 1720 $cm^{-1}$ is mainly relevant to the C=O with no hydrogen bond, whereas the one in a wave number range of 1720 to 1690 $cm^{-1}$ is mainly relevant to that with the hydrogen bond. It is confirmed that the C=O with the hydrogen bond is shifted to the low wave number side, to increase the loss modulus of elasticity (E") level by increasing the infrared absorption intensity (1720 to 1690 $cm^{-1}$)/infrared absorption intensity (1750 to 1720 $cm^{-1}$) ratio, as shown in Table 1. The coating composition of the present invention gives the coating film having the ratio of 0.2 or more, as shown in Table 1, allowing itself to exhibit the high effects with respect to loss modulus of elasticity (E") and loss factor (η).

The infrared absorption in a wave number range of 3600 to 3500$cm^{-1}$ is relevant to the relatively free —OH group, whereas the one in a wave number range of 3500 to 3300 $cm^{-1}$ is relevant to that with the hydrogen bond. As shown in FIG. 3, the increased infrared absorption in a wave number range of 3500 to 3300cm$^{-1}$ indicates increased OH group with the hydrogen bond.

The coating composition of the present invention for damping purposes is incorporated with, as required, a dispersant, antifoaming agent, flow improver, film-making aid, thickening agent, viscosity adjusting agent, among others, in addition to the above-described essential ingredients.

Next, the method of producing the coating composition of the present invention for damping purposes is described.

The method of producing the coating composition is not limited, so long as it can form the above-described hydrogen bond in the coating film and control its number. Some of the examples are the following methods I to III.

The production method I relates to the method of producing the coating composition composed of the above-described coating components (i), (ii) and (iii), comprising the following steps (1) and (2):

(1) a step of dispersion and mixing the coating components (i) and (ii) with each other, and (2) a step of mixing the above mixture with the coating component (iii).

In the production method I, it is preferable to expose the coating components (i) and (ii) in an aqueous solvent to an adequate shear stress, while they are being mixed with each other. More concretely, these components are mixed and stirred at 20 to 60° C. by a stirrer with an adequate blade shape, or roll mixer or ball mill operating at an adequate speed, to prepare the colloidal solution. This step can produce the uniform suspension with the coating component (i) particles dispersed in and bound to the coating component (ii). For the production method I, it is preferable to effect the step of mixing the coating components in an aqueous solvent, which may be incorporated with a solvent for organic aqueous solution, described later.

The production method II can provide the method of producing the coating composition for damping purposes, comprising one of the following 2 steps;

(1) a step of mixing the above-described coating components (i) and (ii) in the presence of a solvent which can dissolve the coating component (ii), and mixing the resultant mixture with the above-described coating component (iii), and (2) a step of mixing the coating components (i), (ii) and (iii) in the presence of a solvent for organic aqueous solution which can dissolve the coating component (ii).

The solvents for organic aqueous solution useful for the production method II and method III described later include organic compounds having carbonyl group, e.g., organic acids (e.g., malonic, succinic and tartaric acid); esters thereof, alkali metal salts (e.g., sodium salt) of polysulfonic, polycarboxylic and polyacrylic acid, among others; and aqueous solutions (e.g., that of ammonium salt).

More concretely, one of the embodiments of the production method II is dissolution of the coating component (ii) in a solvent for organic aqueous solution and mixing the resultant solution with the coating component (i). This makes the coating component (ii) soluble in water, and uniformly dispersed in the coating component (1) emulsion.

The production method III provides the method of producing the coating composition for damping purposes, which comprises the following 2 steps;

(1) a step of bringing the above-described coating component (ii) into contact with the above-described coating component (iii) in the presence of a solvent for organic aqueous solution which can dissolve the coating component (ii), and thereby impregnating the coating component (iii) with the coating component (ii), and a step of mixing the resultant impregnated component with the above-described coating component (i).

The production method III involves, as the first step, bringing a solution of phenol-based compound as the coating component (ii) into contact with a filler as the coating component (iii) to impregnate the latter with the former. This step is to solve the problems resulting from insolubility of the phenol-based compound in water, and thereby to make the compound dispersed in the coating film uniformly and widely.

The solvents useful for the phenol-based compound solution include water, organic compounds and mixture thereof, and may be selected from the ones which can be used for the impregnation. It is particularly preferable to use the above-described solvent for organic aqueous solution. The inorganic filler is not limited, and may be selected from the ones described above, and particularly the flaky or fibrous one is effective for impregnation of the phenol-based composition. It is recommended to use an approximately 5 to 20 times larger quantity by weight of the solution of the above-described coating component (ii) than the coating component (iii).

In the next step of the production method II, the impregnated filler is mixed with the resin emulsion as the coating component (ii).

The ionic emulsion having the above-described properties is suitable for the one for the production methods I, II and III, preferably containing the resin solids at 20 to 70%. Content of the coating component (ii) may be adjusted in such a way that the coating film contains the phenol-based compound at 2 to 30% by weight.

The production conditions for each of the above production methods are not limited, and may be adequately set. Each step may be operated at normal temperature and pressure, and may be batchwise or continuous.

In the above-described production methods, the mixing of each of the coating components (i), (ii) and (iii), i.e., resin emulsion, aromatic hydroxy compound and inorganic filler, may be effected by an agitator, roll mixer, Banbury mixer, grain mill, open kneader or the like, for which one or more components, e.g., dispersant, may be incorporated as required.

The coating composition for damping purposes thus produced may be spread by any coating means, e.g., spray gun, coating brush or sponge.

EXAMPLES

The present invention is described more concretely by EXAMPLES and COMPARATIVE EXAMPLES, which by no means limit the present invention. "Wt. %"for content of each constituent components described in EXAMPLES and COMPARATIVE EXAMPLES is based on the whole damping material.

Loss tangent (tanα), storage modulus (E') and loss modulus (E") of the coating compositions for damping purposes produced by EXAMPLES and COMPARATIVE EXAMPLES were determined by the following methods.

Storage modulus (E') and loss modulus (E") and loss tangent (tanα) were determined by a dynamic viscoelasticity analyzer (DVA-200S (IT Measurement Control Co., Ltd.), was used, where the sample, approximately 20 by 5 by 1 mm in size, was heated in the stretching mode at 50° C./minute at a frequency of 50Hz and dynamic strain of 0.1 %.

Figure 4A:
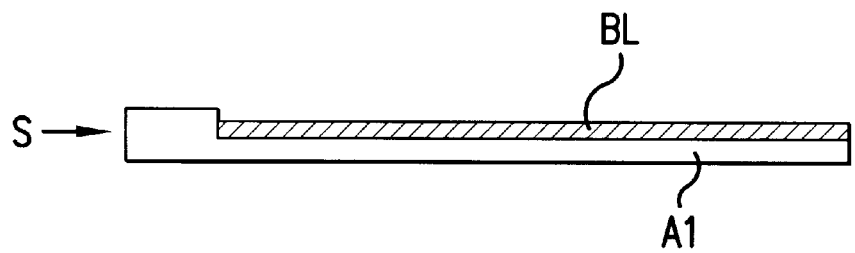
FIG. 4 shows a device for evaluating loss factor ($\eta$) of the coating film of the coating composition of the present invention for damping purposes.
Figure 4B:
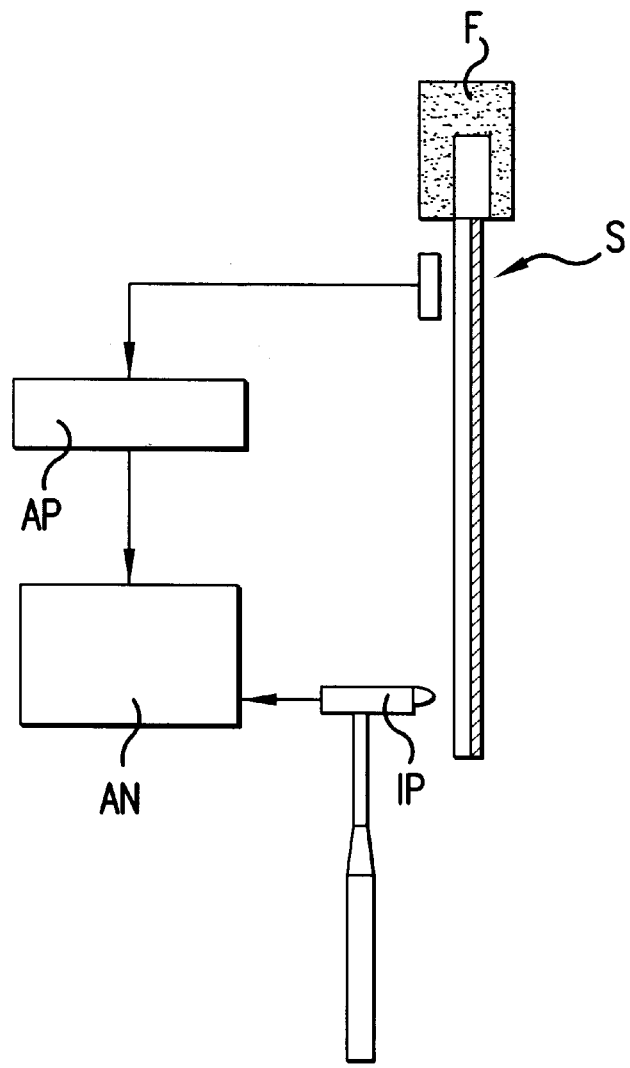

Loss factor (η) is determined by the Measuring method vibration-Damping Properties in accordance with ASTM E 756-98 (FIG. 4), wherein (a) shows the sample S with the aluminum base B coated with the film BL of the coating material for damping purposes, and (b) shows an analyzer for damping characteristics, comprising a fixing section F for holding one side of the sample, impact hammer IP for impact shaking of the sample S, and analyzer for Fourier transformation by a modal analysis software and determining loss factor η by the half-width method from the resonance peaks.

The following additives were used in EXAMPLES and COMPARATIVE

EXAMPLES

Dispersant: Nopcosperse-44C (San-Nopco Co., Ltd.)

Flow improver: Nopcowet (San-Nopco Co., Ltd.)

Viscosity adjusting agent: Ethylene glycol (Wako Pure Chemicals Industries, Ltd.)

Thickening agent: Silica (Nippon Aerosil) and carbon black (Showa Denko K. K.)

Example 1

41.2% by weight of an acrylic-based emulsion (acrylate ester/styrene copolymer resin emulsion, which was the same in following EXAMPLES and COMPARATIVE EXAMPLES) (Pegar 873(Koatsu Gas Kogyo Co., LTd.) resin: 50% by weight (residue on evaporation)) was well mixed with 13.7% by weight of 4,4'-thiobis(3-methyl-6-tert-butylphenol) (hereinafter referred to as BPSR, (Nonflex BPS-R (Seiko Kagaku)), and the resultant mixture was incorporated and well mixed with 32.9% by weight of an inorganic filler (Mica 200 HK(Kuraray)), 0.1% by weight of a dispersant, 0.1% by weight of a flow improver, 0.9% by weight of a viscosity adjusting agent, 1.8% by weight of a thickening agent and 9.3% by weight of water for viscosity adjustment, to prepare the coating composition for damping purposes.

Example 2

33.6% by weight of an acrylic-based emulsion (Pegar 873(Koatsu Gas Kogyo Co., Ltd.)) was well mixed with 10.9% by weight of BPSR (Nonflex BPS-R (Seiko Kagaku)), and the resultant mixture was incorporated and well mixed with 43.4% by weight of an inorganic filler (Mica 200HK (Kuraray)), 0.1% by weight of a dispersant, 0.1% by weight of a flow improver, 0.9% by weight of a viscosity adjusting agent, 1.8% by weight of a thickening agent and 9.2% by weight of water for viscosity adjustment, to prepare the coating composition for damping purposes.

Example 3

32.3% by weight of an acrylic-based emulsion (Pegar 873(Koatsu Gas Kogyo Co., Ltd.)) was well mixed with 4.0% by weight of (Nonflex BPS-R (Seiko Kagaku)), and the resultant mixture was incorporated and well mixed with 51.6% by weight of an inorganic filler (Mica 200 HK (Kuraray)), 0.1% by weight of a dispersant, 0.1% by weight of a flow improver, 0.9% by weight of a viscosity adjusting agent, 1.8% by weight of a thickening agent and 9.2% by weight of water for viscosity adjustment, to prepare the coating composition for damping purposes.

Example 4

32.9% by weight of an acrylic-based emulsion (Pegar 873(Koatsu Gas Kogyo Co., Ltd.)) was well mixed with 15.6% by weight of BPSR (Nonflex BPS-R (Seiko Kagaku)), and the resultant mixture was incorporated and well mixed with 39.3% by weight of an inorganic filler (mixture of 30.3% by weight of, Mica 200HK(Kuraray) and 9% by weight of calcium carbonate), 0.1% by weight of a dispersant, 0.1% by weight of a flow improver, 0.9% by weight of a viscosity adjusting agent, 1.8% by weight of a thickening agent and 9.3% by weight of water for viscosity adjustment, to prepare the coating composition for damping purposes.

Example 5

42.7% by weight of an acrylic-based emulsion (Pegar 873(Koatsu Gas Kogyo Co., Ltd.)) was well mixed with 20.1% by weight of BPSR BPSR (Nonflex BPS-R (Seiko Kagaku)), and the resultant mixture was incorporated and well mixed with 16.6% by weight of an inorganic filler (Mica 200HK (Kuraray)), 0.1% by weight of a dispersant, 0.1% by weight of a flow improver, 0.4% by weight of a viscosity adjusting agent, 0.9% by weight of silica as a thickening agent and 19.2% by weight of water for viscosity adjustment, to prepare the coating composition for damping purposes.

Example 6

60.1% by weight of a vinyl acetate-based emulsion (EVA P-20 (Showa Highpolymer Co., Ltd.)) was well mixed with 9.6% by weight of BPSR (Nonflex BPS-R (Seiko Kagaku)), and the resultant mixture was incorporated and well mixed with 9.0% by weight of an inorganic filler (Mica 200HK (Kuraray)), 0.1% by weight of a dispersant, 0.1% by weight of a flow improver, 0.6% by weight of a viscosity adjusting agent, 1.2% by weight of silica as a thickening agent and 19.3% by weight of water for viscosity adjustment, to prepare the coating composition for damping purposes.

Example 7

41.9% by weight of an acrylic-based (Pegar 873(Koatsu Gas Kogyo Co., Ltd.)) was well mixed with 14.0% by weight of BPSR (Nonflex BPS-R (Seiko Kagaku)), and the resultant mixture was incorporated and well mixed with 33.6% by weight of an inorganic filler (Mica 200HK (Kuraray)), 0.1% by weight of a dispersant, 0.1% by weight of a flow improver, 0.9% by weight of a viscosity adjusting agent and 9.4% by weight of water for viscosity adjustment, to prepare the coating composition for damping purposes.

Example 8

13.1% by weight of BPSR (Nonflex BPS-R (Seiko Kagaku)) partially dissolved in 9.7% by weight of a 30% aqueous solution of succinate ester was well mixed with 40.0% by weight of an acrylic-based emulsion (Pegar 873 (Koatsu Gas Kogyo Co., Ltd.)), and the resultant mixture was incorporated and well mixed with 32.6% by weight of an inorganic filler (Mica 200HK (Kuraray)), 0.1% by weight of a dispersant, 0.1% by weight of a flow improver, 0.4% by weight of a viscosity adjusting agent and 4.0% by weight of water for viscosity adjustment, to prepare the coating composition for damping purposes.

Example 9

32.6% by weight of an inorganic filler (Mica 200HK (Kuraray))was impregnated with 13.1% by weight of BPSR (Nonflex BPS-R (Seiko Kagaku)) partially dissolved in 9.7% by weight of a 30% aqueous solution of succinate ester. It was well mixed with 40.0% by weight of an acrylic-based emulsion (Pegar 873(Koatsu Gas Kogyo Co., Ltd.)), and the resultant mixture was incorporated with 0.1% by weight of a dispersant, 0.1% by weight of a flow improver, 0.4% by weight of a viscosity adjusting agent and 4.0% by weight of water for viscosity adjustment, to prepare the coating composition for damping purposes.

Example 10

63.5% by weight of an acrylic-based emulsion (Pegar 873(Koatsu Gas Kogyo Co., Ltd.)) was well mixed with 21.0% by weight of BPSR (Nonflex BPS-R (Seiko Kagaku)), and the resultant mixture was incorporated with 2.5% by weight of an inorganic filler (Kunipia (Kunimine Kogyo)), 0.1% by weight of a dispersant, 0.1% by weight of a flow improver, 0.6% by weight of a viscosity adjusting agent, 1.3% by weight of silica as a thickening agent and 10.9% by weight of water for viscosity adjustment, to prepare the coating composition for damping purposes.

Example 11

41.2% by weight of an acrylic-based emulsion (Pegar 873(Koatsu Gas Kogyo Co., Ltd.)) was well mixed with 13.7% by weight of BPSR (Nonflex BPS-R (Seiko Kagaku)), and the resultant mixture was incorporated with 32.9 by weight of an inorganic filler (Mica 200HK (Kuraray)), 0.1% by weight of a dispersant, 0.1% by weight of a flow improver, 0.9% by weight of a viscosity adjusting agent, 1.8% by weight of carbon black (Ketjen black) as a thickening agent and 9.3% by weight of water for viscosity adjustment, to prepare the coating composition for damping purposes.

Example 12

33.6% by weight of an acrylic-based emulsion (BC-280 (Dai-Nippon Ink. & Chemicals Inc.,)) was well mixed with 10.9% by weight of BPSR (Nonflex BPS-R (Seiko Kagaku)), and the resultant mixture was incorporated with 43.4% by weight of an inorganic filler (Mica 200HK (Kuraray)), 0.1% by weight of a dispersant, 0.1% by weight of a flow improver, 0.9% by weight of a viscosity adjusting agent, 1.8% by weight of silica as a thickening agent and 9.2% by weight of water for viscosity adjustment, to prepare the coating composition for damping purposes.

Example 13

41.2% by weight of an acrylic-based emulsion (BC-280 (Dai-Nippon Ink. & Chemicals Inc.,)) was well mixed with 13.7% by weight of BPSR (Nonflex BPS-R (Seiko Kagaku)), and the resultant mixture was incorporated with 32.9% by weight of an inorganic filler (Mica 200HK (Kuraray)), 0.1% by weight of a dispersant, 0.1% by weight of a flow improver, 0.9% by weight of a viscosity adjusting agent, 1.8% by weight of silica as a thickening agent and 9.3% by weight of water for viscosity adjustment, to prepare the coating composition for damping purposes.

Example 14

41.2% by weight of a vinyl acetate-based emulsion (EVA P-20 (Showa Highpolymer Co., Ltd.)) was well mixed with 13.7% by weight of BPSR (Nonflex BPS-R (Seiko Kagaku)), and the resultant mixture was incorporated and well mixed with 32.9% by weight of an inorganic filler (Mica 200HK (Kuraray)), 0.1% by weight of a dispersant, 0.1% by weight of a flow improver, 0.8% by weight of a viscosity adjusting agent, 1.8% by weight of silica as a thickening agent and 9.4% by weight of water for viscosity adjustment, to prepare the coating composition for damping purposes.

Example 15

60.1% by weight of a vinyl acetate-based emulsion (EVA P-20 (Showa Highpolymer Co., Ltd.)) was well mixed with 9.6% by weight of 4,4'-dihydroxybiphenyl (Wako Pure Chemicals Industries), and the resultant mixture was incorporated and well mixed with 9.0% by weight of an inorganic filler (Mica 200HK (Kuraray)), 0.1% by weight of a dispersant, 0.1% by weight of a flow improver, 0.6% by weight of a viscosity adjusting agent, 1.8% by weight of silica as a thickening agent and 19.3% by weight of water for viscosity adjustment, to prepare the coating composition for damping purposes.

Example 16

44.2% by weight of an acrylic/urethane-based emulsion (AP-3840 (Showa Highpolymer Co., Ltd.)) was well mixed with 14.6% by weight of BPSR (Nonflex BPS-R (Seiko Kagaku)), and the resultant mixture was incorporated and well mixed with 35.3% by weight of an inorganic filler (Mica 200HK (Kuraray)), 0.1% by weight of a dispersant, 0.1% by weight of a flow improver, 0.4% by weight of a viscosity adjusting agent, 0.9% by weight of silica as a thickening agent and 4.4% by weight of water for viscosity adjustment, to prepare the coating composition for damping purposes.

Example 17

60.1% by weight of an acrylic-based emulsion (Pegar 873(Koatsu Gas Kogyo Co., Ltd.)) was well mixed with 9.67% by weight of BPSR (Nonflex BPS-R (Seiko Kagaku)), and the resultant mixture was incorporated with 9.0% by weight of an inorganic filler (Sonohaiji (Ube Materials)), 0.1% by weight of a dispersant, 0.1% by weight of a flow improver, 0.6% by weight of a viscosity adjusting agent, 1.2% by weight of silica as a thickening agent and 19.3% by weight of water for viscosity adjustment, to prepare the coating composition for damping purposes.

Example 18

51.0% by weight of an acrylic-based emulsion (Pegar 873(Koatsu Gas Kogyo Co., Ltd.)) was well mixed with 17.0% by weight of BPSR (Nonflex BPS-R (Ohuchi shinko Kagaku)), and the resultant mixture was incorporated with 9.1% by weight of an inorganic filler (Smectone SA (Kunimine Kogyo)), 0.1% by weight of a dispersant, 0.1% by weight of a flow improver, 1.13% by weight of a viscosity adjusting agent, 2.3% by weight of silica as a thickening agent and 19.3% by weight of water for viscosity adjustment, to prepare the coating composition for damping purposes.

Example 19

A mixture of 60.1% by weight of a vinyl acetate-based emulsion (EVA P-20 (Showa Highpolymer Co., Ltd.)), 9.6% by weight of 5-amino-1-naphthol (Wako Pure Chemicals Industries), 9.0% by weight of an inorganic filler (Mica 200HK (Kuraray)), 0.1% by weight of a dispersant, 0.1% by weight of a flow improver, 0.6% by weight of a viscosity adjusting agent, 1.2% by weight of silica as a thickening agent and 19.3% by weight of water for viscosity adjustment was prepared as the coating composition for damping purposes.

Comparative Example 1

A mixture of 60.5% by weight of a vinyl acetate-based emulsion (EVA P-20 (Showa Highpolymer Co., Ltd.)), 18.1% by weight of an inorganic filler (Mica 200HK (Kuraray)), 0.1% by weight of a dispersant, 0.1% by weight of a flow improver, 0.6% by weight of a viscosity adjusting agent, 1.2% by weight of silica as a thickening agent and 19.4% by weight of water for viscosity adjustment was prepared as the coating composition for damping purposes.

Comparative Example 2

A mixture of 51.7% by weight of an acrylic-based emulsion (Pegar 873(Koatsu Gas Kogyo Co., Ltd.)), 41.4% by weight of an inorganic filler (Mica 200HK (Kuraray)), 0.1% by weight of a dispersant, 0.1% by weight of a flow improver, 0.5% by weight of a viscosity adjusting agent, 1.0% by weight of silica as a thickening agent and 5.2% by weight of water for viscosity adjustment was prepared as the coating composition for damping purposes.

Comparative Example 3

68.3% by weight of an acrylic-based emulsion (Pegar 873(Koatsu Gas Kogyo Co., Ltd.)) was well mixed with 22.5% by weight of BPSR (Nonflex BPS-R (Seiko Kagaku)), and the resultant mixture was incorporated with 0.1% by weight of a dispersant, 0.1% by weight of a flow improver, 0.7% by weight of a viscosity adjusting agent, 1.4% by weight of silica as a thickening agent and 6.8% by weight of water for viscosity adjustment, to prepare the coating composition for damping purposes.

Comparative Example 4

A commercial acrylic-based coating composition (Atom Spray (Atomics)) was used for the coating composition for damping purposes.

Evaluation of the Damping Effects

Two types of the samples were prepared for each of the coating compositions prepared in EXAMPLES 1 to 19 and COMPARATIVE EXAMPLES 1 to 4, to analyze their damping effects; one was an aluminum plate coated with the coating film to a thickness of 0.5 mm and the other to a thickness of 1 mm. Each of the coating films was measured for loss factor ($\eta$) at a resonance frequency of 50 and 1200 Hz. The results are given in Tables 2 and 3.

TABLE 1

Ratio of the hydrogen bond and loss modulus E"

| | Index of the hydrogen bond ratio Infrared absorption intensity (1720 to 1690 cm$^{-1}$)/ infrared absorption intensity (1720 to 1750 cm$^{-1}$) | Loss modulus, E"N · m$^{-2}$ |
|---|---|---|
| EXAMPLE 3 | 0.43 | 1.11 × 10$^8$ |
| EXAMPLE 1 | 0.70 | 3.20 × 10$^8$ |
| COMPARATIVE EXAMPLE 5 | 1.30 | 2.14 × 10$^8$ |
| COMPARATIVE EXAMPLE 2 | 0.05 | 1.00 × 10$^8$ |

TABLE 2

Vibration-absorbing effect at around a resonance frequency of 50 Hz

| | Loss factor $\eta$ | |
|---|---|---|
| | Coating film thickness: 0.5 mm | Coating film thickness: 1 mm |
| EXAMPLE 1 | 0.090 | 0.170 |
| EXAMPLE 2 | 0.111 | 0.207 |
| EXAMPLE 3 | 0.080 | 0.149 |
| EXAMPLE 4 | 0.091 | 0.167 |
| EXAMPLE 5 | 0.061 | 0.132 |
| EXAMPLE 6 | 0.052 | 0.121 |
| EXAMPLE 7 | 0.036 | 0.097 |
| EXAMPLE 8 | 0.050 | 0.125 |
| EXAMPLE 9 | 0.060 | 0.135 |
| EXAMPLE 10 | 0.049 | 0.093 |
| EXAMPLE 11 | 0.068 | 0.133 |
| EXAMPLE 12 | 0.063 | 0.120 |
| EXAMPLE 13 | 0.047 | 0.091 |
| EXAMPLE 14 | 0.034 | 0.088 |
| EXAMPLE 15 | 0.036 | 0.080 |
| EXAMPLE 16 | 0.090 | 0.167 |
| EXAMPLE 17 | 0.031 | 0.065 |
| EXAMPLE 18 | 0.035 | 0.078 |
| EXAMPLE 19 | 0.032 | 0.067 |
| COMARATIVE EXAMPLE 1 | 0.017 | 0.034 |
| COMARATIVE EXAMPLE 2 | 0.028 | 0.059 |
| COMARATIVE EXAMPLE 3 | 0.022 | 0.051 |
| COMARATIVE EXAMPLE 4 | 0.025 | 0.060 |

TABLE 3

Vibration-absorbing effect at around a resonance frequency of 1200 Hz

| | Loss factor $\eta$ | |
|---|---|---|
| | Coating film thickness: 0.5 mm | Coating film thickness: 1 mm |
| EXAMPLE 2 | 0.061 | 0.108 |
| EXAMPLE 6 | 0.065 | 0.125 |
| EXAMPLE 10 | 0.071 | 0.124 |
| EXAMPLE 14 | 0.128 | 0.220 |
| COMARATIVE EXAMPLE 1 | 0.042 | 0.084 |
| COMARATIVE EXAMPLE 2 | 0.060 | 0.102 |
| COMARATIVE EXAMPLE 3 | 0.003 | 0.017 |
| COMARATIVE EXAMPLE 4 | 0.055 | 0.105 |

EFFECTS OF THE INVENTION

The coating film of the coating composition of the present invention for damping purposes can realize a high loss factor ii in a low frequency and high frequency range, even when it is thin, because of its high loss modulus E", and is easily applicable to a vibration- or sound-generating section of complex shape.

What is claimed is:
1. A coating composition for damping purposes, which comprises the following coating components (i), (ii) and (iii):
   (i) a resin emulsion containing a polar group capable of forming a coating film containing hydrogen bonds which are formed when the polar group comes into contact with an aromatic compound coating component (ii) having a hydrogen bond forming effect;
   (ii) an aromatic compound which has the effect of forming and controlling hydrogen bonds, has at least one hydroxyl group in the molecule, and contains at least one amino group in the molecule; and
   (iii) an inorganic filler.

2. The coating composition for damping purposes according to claim 1, wherein said coating component (i) is an emulsion of at least one type of the resin selected from the group consisting of acrylic-based resin, acrylic-styrene-based resin, vinyl acetate-based resin, vinyl acetate-acrylic-based resin, ethylene-vinyl acetate-based resin, urethane-based resin, epoxy-based resin, phenol-based resin, alkyd-based resin, polyester-based resin, synthetic rubber latex, a copolymer of the above monomers, and a modified resin thereof.

3. The coating composition for damping purposes according to claim 1, wherein said coating component (iii) is at least one type of inorganic filler selected from the group consisting of saponite, montmorillonite, smectite, xonotlite, mica, talc, calcium carbonate, natural and synthetic zeolite, sawdust, rice bran, graphite and flaky silica.

4. The coating composition for damping purposes according to claim 1, wherein said coating component (iii) is a layered compound containing silica, alumina or magnesia.

5. The coating composition for damping purposes according to claim 1, wherein said aromatic compound having hydroxyl group is 4,4'-dihydroxybiphenyl, 4,4'-thiobisphenol or a mixture thereof.

6. The coating composition for damping purposes according to claim 1, wherein said aromatic compound having hydroxyl group is hydroquinone, 1,5-dihydroxynaphthalene or a mixture thereof.

7. The coating composition for damping purposes according to claim 1, wherein said aromatic compound having hydroxyl and amino groups is 5-amino-1-naphthol, 2-amino-6-hydroxynaphthol or a mixture thereof.

8. The coating composition for damping purposes according to claim 1, wherein said coating components (i), (ii) and (iii) are incorporated at 10 to 75% by weight, 2 to 30% by weight and 2 to 60% by weight, respectively, based on the whole coating composition for damping purposes.

9. A coating film, having a loss factor $\eta$ of 0.03 or more at a frequency of 50 Hz and 0.065 or more at 1200 Hz at a film thickness of 2 mm or less, which comprises the following coating components (i), (ii) and (iii):
  (i) a resin emulsion containing a polar group capable of forming a coating film containing hydrogen bonds which are formed when the polar group comes into contact with an aromatic compound coating component (ii) having a hydrogen bond forming effect;
  (ii) an aromatic compound which has the effect of forming and controlling hydrogen bonds, and also has at least one hydroxyl group in the molecule, and
  (iii) an inorganic filler.

10. The coating film according to claim 9, wherein the coating film has a loss modulus E" of $1\times10^8$ to $8.5\times10^8$ $N\cdot m^{-2}$ in a service temperature range.

11. A method of producing a damping coating composition, comprising the components (i), (ii) and (iii):
  (i) a resin emulsion containing a polar group capable of forming a coating film containing hydrogen bonds which are formed when the polar group comes into contact with an aromatic compound coating component (ii) having a hydrogen bond forming effect;
  (ii) an aromatic compound which has the effect of forming and controlling hydrogen bonds, and also has at least one hydroxyl group in the molecule, and
  (iii) an inorganic filler,
    which comprises the following steps (1) and (2):
      (1) a step of dispersing and mixing said coating components (i) and (ii) with each other, and
      (2) a step of mixing the above mixture with said coating component (iii).

12. A method of producing a damping coating composition, comprising the components (i), (ii) and (iii):
  (i) a resin emulsion containing a polar group capable of forming a coating film containing hydrogen bonds which are formed when the polar group comes into contact with an aromatic compound coating component (ii) having a hydrogen bond forming effect;
  (ii) an aromatic compound which has the effect of forming and controlling hydrogen bonds, and also has at least one hydroxyl group in the molecule, and
  (iii) an inorganic filler,
    which comprises the following steps (1) and (2):
      (1) a step of mixing said coating components (i) and (ii) in the presence of a solvent which can dissolve said coating component (ii), and mixing the resultant mixture with said coating component(iii); or
      (2) a step of mixing said coating components (i), (ii) and (iii) in the presence of a solvent for an organic aqueous solution which can dissolve said coating component (ii).

13. A method of producing a damping coating composition, comprising the components (i), (ii) and (iii):
  (i) a resin emulsion containing a polar group capable of forming a coating film containing hydrogen bonds which are formed when the polar group comes into contact with an aromatic compound coating component (ii) having a hydrogen bond forming effect;
  (ii) an aromatic compound which has the effect of forming and controlling hydrogen bonds, and also has at least one hydroxyl group in the molecule, and
  (iii) an inorganic filler,
    which comprises the following steps (1) and (2):
      (1) a step of bringing said coating component (ii) into contact with said coating component (iii) in the presence of a solvent for an organic aqueous solution which can dissolve said coating component (ii), and thereby impregnating said coating component (iii) with said coating component (ii), and
      (2) a step of mixing the resultant impregnated component with said coating component (i).

* * * * *